United States Patent [19]

Mizuta et al.

[11] Patent Number: 4,773,293
[45] Date of Patent: Sep. 27, 1988

[54] METHOD OF AND APPARATUS FOR MANUFACTURING LINER FOR MAGNETIC DISK

[75] Inventors: Akira Mizuta; Shozi Iwamoto; Yasushi Hatano, all of Kanagawa, Japan

[73] Assignee: Fuji Photo Film Co., Ltd., Kanagawa, Japan

[21] Appl. No.: 946,216

[22] Filed: Dec. 24, 1986

[30] Foreign Application Priority Data

Dec. 25, 1985 [JP] Japan ................... 60-296097

[51] Int. Cl.$^4$ ............................ B26D 3/00; B26D 5/20
[52] U.S. Cl. ............................................ 83/39; 83/40;
83/42; 83/107; 83/256; 83/405; 83/650
[58] Field of Search ................ 83/39, 40, 255, 256, 83/272, 404, 405, 102, 107, 27, 35, 42, 650, 404.2; 156/253, 254, 324

[56] References Cited

U.S. PATENT DOCUMENTS

| | | | |
|---|---|---|---|
| 1,914,293 | 6/1933 | Reynolds | 83/272 |
| 3,107,566 | 10/1963 | Archer | 83/40 |
| 3,496,815 | 2/1970 | Ruhl | 83/29 |
| 3,605,535 | 9/1971 | Love et al. | 83/40 |
| 3,795,166 | 3/1974 | Brand | 83/409 |
| 3,854,359 | 12/1974 | Tagami | 83/255 |
| 4,344,342 | 8/1982 | Garvin | 83/255 |

FOREIGN PATENT DOCUMENTS 61-162873 7/1986 Japan .

Primary Examiner—E. R. Kazenske
Assistant Examiner—Eugenia A. Jones
Attorney, Agent, or Firm—Sughrue, Mion, Zinn, Macpeak & Seas

[57] ABSTRACT

A method of manufacturing a liner for a magnetic disk which is formed of non-woven fabric and has a predetermined width, a predetermined length, a central opening and contoured four corners comprising steps of supplying a plurality of non-woven fabric strips, each having a width substantially equal to the width of the liner to be formed, in a stacked state, stamping out openings in the stacked non-woven fabrics, cutting the portion of the stacked non-woven fabrics corresponding to the contoured four corners of the liners to be formed, simultaneously with the stamping of the openings, subsequently separating the non-woven fabric strips and cutting the leading edge portion of the non-woven fabric strips into the predetermined length.

2 Claims, 5 Drawing Sheets

F I G. 4
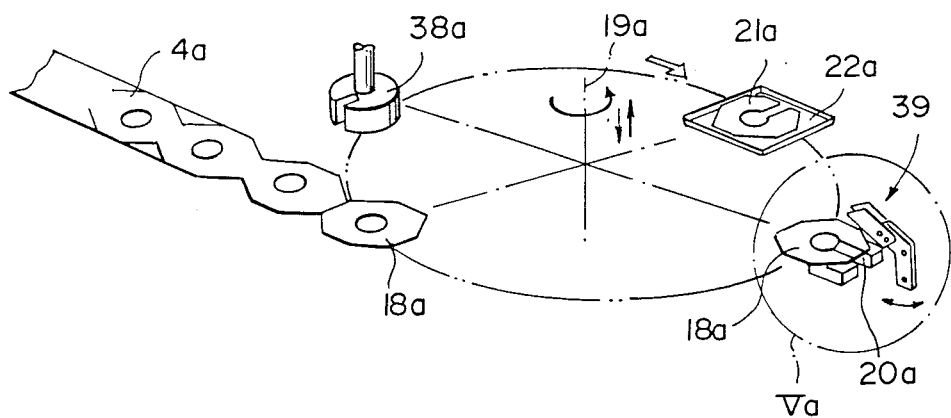

FIG.5A
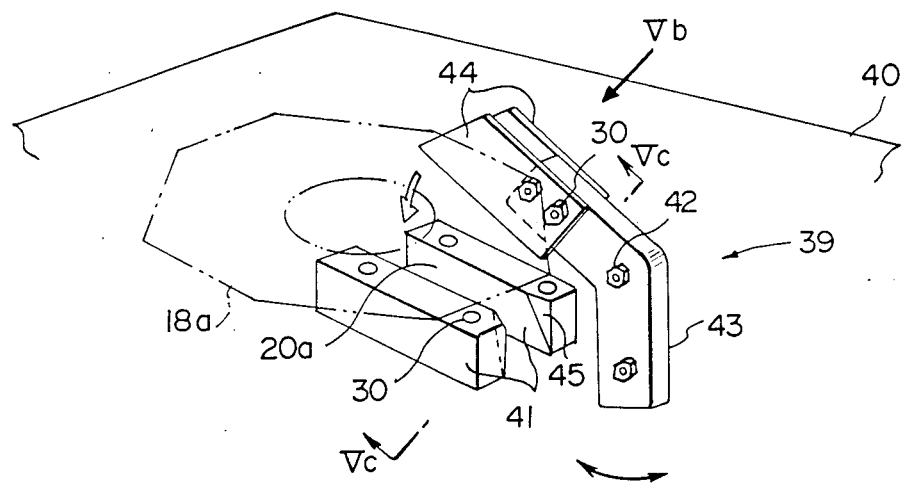
FIG.5B
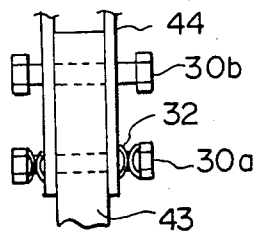
FIG.5C
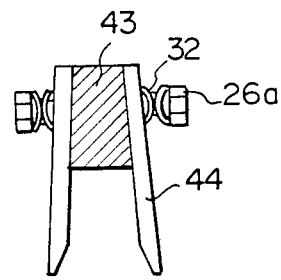
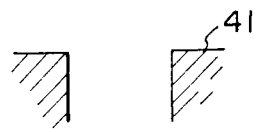

4,773,293

METHOD OF AND APPARATUS FOR MANUFACTURING LINER FOR MAGNETIC DISK

BACKGROUND OF THE INVENTION

1. Field of the Invention

This invention relates to a method of and an apparatus for manufacturing a liner which is formed of non-woven fabric and is incorporated in a casing of a magnetic disk for protection and cleaning of the magnetic disk.

2. Description of the Prior Art

Conventionally, the liner for the magnetic disk is formed by stamping a sheet of non-woven fabric or a plurality of stacked sheets of non-woven fabrics to shape using contoured dies. However the conventional method using the contoured dies is disadvantageous in the following points. That is, contoured dies are generally inherently complex in shape and accordingly are difficult to form with high accuracy. At the same time, the non-woven fabric from which the liner is stamped out is generally of rayon, polyethylene terephthalate or the like which has poor processability, and the complexly contoured dies soon become blunted. Accordingly, in the case that a single sheet of non-woven fabric is stamped into a liner, there is too much wear of the dies relative to the number of liners to be manufactured, while stamping a plurality of stacked sheets of non-woven fabric into liners is very difficult and requires manual separation of the formed liners. Further, when the liner is stamped out from a sheet or sheets of the non-woven fabric by the contoured dies, each sheet of non-woven fabric must be larger than the liner to be formed, and accordingly the yield rate of the material is low.

On the other hand, if the non-woven fabric is stamped into the final shape of the liner in a plurality of stamping steps, the number of the dies is increased, adding to the manufacturing cost of the liner.

SUMMARY OF THE INVENTION

In view of the foregoing observations and description, the primary object of the present invention is to provide an improved method of manufacturing the liner whereby the liner can be manufactured with high accuracy at low cost and without shortening the life of the tools, and at the same time loss of the material can be minimized.

Another object of the present invention is to provide an apparatus for carrying out the method.

In accordance with one aspect of the present invention, there is provided a method of manufacturing a liner for a magnetic disk which is formed of non-woven fabric and has a predetermined width, a predetermined length, a central opening and contoured four corners comprising steps of supplying a plurality of non-woven fabric strips, each having a width substantially equal to the width of the liner to be formed, in a stacked state, stamping out openings in the stacked non-woven fabrics, cutting the portion of the stacked non-woven fabrics corresponding to the contoured four corners of the liners to be formed, simultaneously with the stamping of the openings, subsequently separating the non-woven fabric strips and cutting the leading edge portion of the non-woven fabric strips into the predetermined length.

In another aspect of the present invention, there is provided an apparatus for manufacturing a liner for a magnetic disk which is formed of non-woven fabric and has a predetermined width, a predetermined length, a central opening and contoured four corners comprising stamping dies having a punch portion and a die portion for stamping out the central openings in a plurality of non-woven fabric strips supplied in a stacked state, each having a width substantially equal to the width of the liner to be formed, and lower cutting edges and upper cutting edges which are removably mounted on the punch portion and the die portion and cut the portion of the stacked non-woven fabrics corresponding to the contoured four corners of the liners to be formed, simultaneously with the stamping of the openings.

BRIEF DESCRIPTION OF THE DRAWINGS

FIG. 4 is a schematic view for illustrating the operation of the pickup device employed in the apparatus, FIG. 5A is an enlarged view showing the part of FIG. 4 designated by circle Va, FIG. 5B is a view showing a part of FIG. 5A as viewed in the direction of arrow Vb, and FIG. 5C is a cross-sectional view taken along line Vc—Vc in FIG. 5A.

DESCRIPTION OF THE PREFERRED EMBODIMENT

Figure 1:
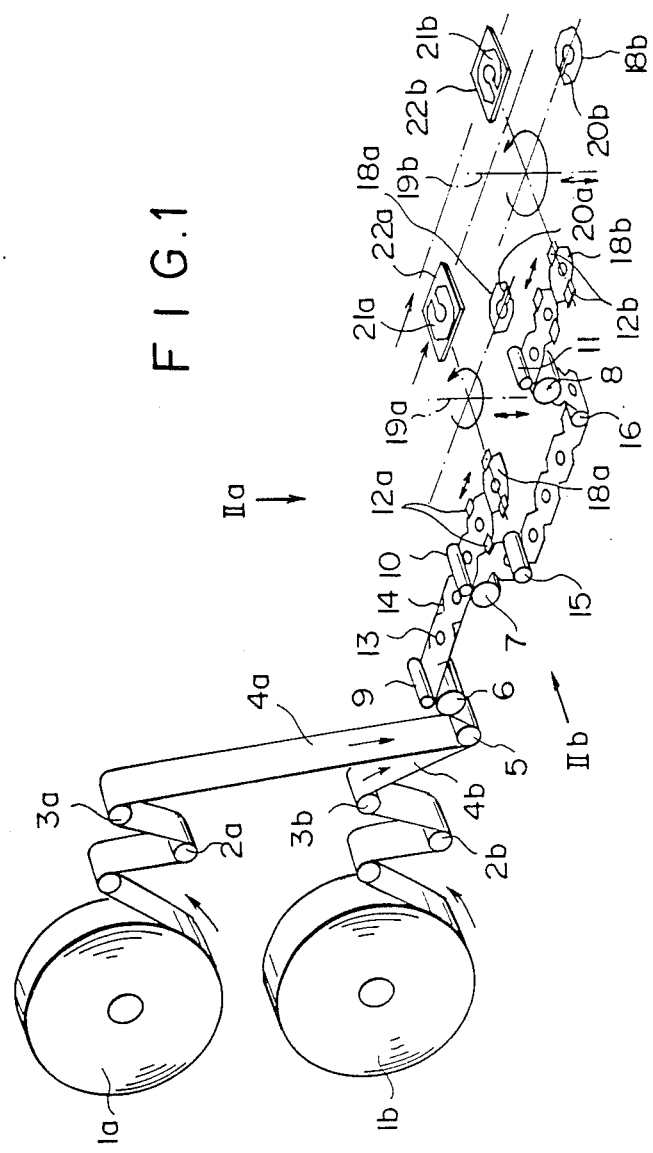
FIG. 1 is a schematic view illustrating the method of manufacturing the liner in accordance with an embodiment of the present invention.
Figure 2:
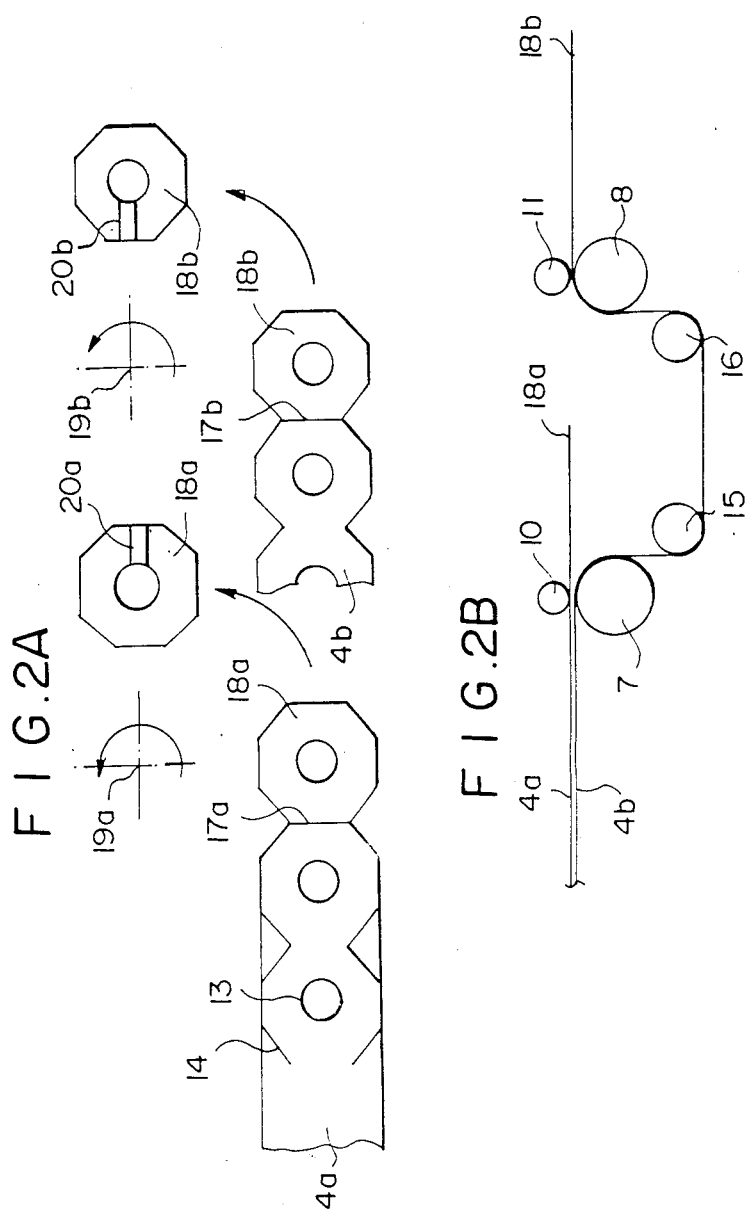
FIG. 2A is a view showing a part of FIG. 1 as viewed in the direction of arrow IIa.
FIG. 2B is a view showing a part of FIG. 1 as viewed in the direction of arrow IIb.

In FIG. 1, a first non-woven fabric strip 4a is rolled into a first supply roll 1a, and a second non-woven fabric strip 4b is rolled into a second supply roll 1b. Each of the first and second non-woven fabric strips 4a and 4b has a width equal to the width of a liner for a magnetic disk to be formed. The first and second non-woven fabric strips 4a and 4b are unrolled respectively from the supply rolls 1a and 1b by way of tension rollers 2a and 2b and pass across rollers 3a and 3b and are superposed one on the other when passing across a pass roller 5. The superposed non-woven fabric strips 4a and 4b are intermittently fed by a length corresponding to the length of the liner to be formed by driving rollers 6, 7 and 8, nip rollers 9, 10 and 11 respectively associated with the driving rollers 6, 7 and 8, and a pair of grippers 12a and 12b which are moved back and forth in synchronization with rotation of the driving rollers 6, 7 and 8. After passing the driving roller 6, a central opening 13 and four slits 14 are simultaneously formed in both the strips 4a and 4b in the superposed state by stamping and cutting, two of the slits 14 extending obliquely forward from opposite edges of the strips 4a and 4b and the other two slits 14 extending obliquely rearward from opposite edges of the same, as shown in detail in FIGS. 2A and 2B. That is, a pair of triangular cutaway portions are formed on opposite edges of the strips 4a and 4b by the forward slits 14 and the rearward slits 14 formed in two successive stamping and cutting steps.

The first and second non-woven fabric strips 4a and 4b are separated after passing the driving roller 7, and the first non-woven fabric strip 4a is cut, immediately after passing the driving roller 7, at a position distant from the leading edge of the strip 4a, i.e., along the line 17a joining the apexes of the triangular cutaway portions, thereby forming a semi-finished liner 18a, and the second non-woven fabric strip 4b is cut, after passing around a dancer roller 15 and a pass roller 16, and the driving roller 8, at a position distant from the leading edge of the strip 4b, i.e., along the line 17b joining the apexes of the triangular cutaway portions, thereby forming a semi-finished liner 18b.

Thus, the semi-finished liners 18a and 18b having the central opening 13 and the contoured four corners are cut off respectively from the first and second non-woven fabric strips 4a and 4b each time the strips 4a and 4b are fed by the length corresponding to the length of the liner to be formed. The semi-finished liners 18a and 18b are picked up by pickup devices which are rotated about axes 19a and 19b in synchronization with the intermittent feed of the strips 4a and 4b, and are rotated by predetermined angles. When the semi-finished liners 18a and 18b are rotated by 90°, window portions 20a and 20b (which correspond to the window of the casing of the magnetic disk) are cut in the semi-finished liners 18a and 18b, thereby forming finished liners 21a and 21b. Thereafter, the liners 18a and 18b are rotated by 180° and are respectively incorporated into upper and lower halves 22a and 22b of a magnetic disk casing fed in parallel to the feeding direction of the non-woven fabric strips 4a and 4b.

Figure 3:
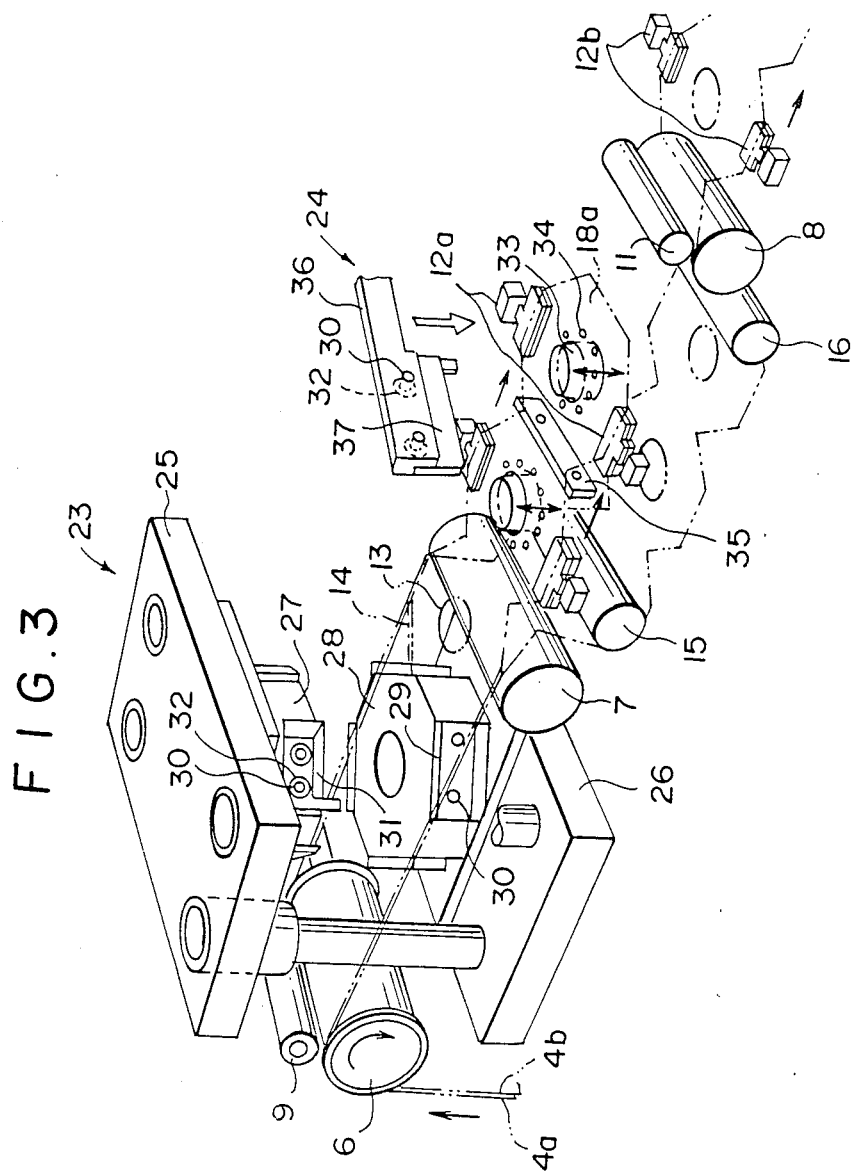
FIG. 3 is a schematic perspective view showing an example of an apparatus for carrying out the method of the present invention.

In FIG. 3, a stamping-and-cutting die set 23 for stamping the central openings 13 and cutting the slits 14 in the strips 4a and 4b, and a cutter 24 for cutting off the semi-finished liners 18a and 18b from the strips 4a and 4b are shown.

The die set 23 is disposed between the driving rollers 6 and 7 where the strips 4a and 4b are fed in the superposed state and comprises a movable upper die 25 and a stationary lower die 26. The upper die 25 and the lower die 26 are respectively provided with a punch portion 27 and a die portion 28 for forming the central opening 13. The outer shape of the punch portion 27 and the die portion 28 is octagonal. The die portion 28 is provided with four lower cutting edges 29 which are fixed thereto with bolts 30 along every other side thereof. Four upper cutting edges 31 are fixed to the punch portion 27 by way of plate springs (or coil springs) 32 opposed to the lower cutting edges 30. The upper cutting edges 31 are mounted to form a crossing angle of 0.5° to 1° (preferably 0.5°) and a shear angle of 2° to 5° (about 3°) with respect to the lower cutting edges 29.

The cutter 24 is disposed downstream of the driving roller 7 where the first and second non-woven fabric strips 4a and 4b are separated from each other and cuts off the semi-finished liner 18a. Though not shown in FIG. 3, another cutter of the same structure as the cutter 24 is disposed downstream of the driving roller 8 and cuts off the semifinished liner 18b. The cutter 24 is provided with a pair of locating pins 33 which are disposed below the first strip 4a to be movable up and down. The locating pins 33 are moved upward, when the first strip 4a is brought to the position shown in FIG. 3 by the grippers 12a, to be respectively inserted into the central openings 13 of the first and second semi-finished liners 18a as numbered from the leading edge of the first strip 4a. The upper end portion of each locating pin 33 is tapered to facilitate insertion of the pin 33 into the central opening 13. A plurality of suction holes 34 are formed around each locating pin 33 to hold the strip 4a upon insertion of the locating pins 33. Between the locating pins 33 is fixed a lower cutting edge 35, and an upper cutting edge 37 is supported above the lower cutting edge 35 to form a crossing angle of 0.5° to 1° with respect to the lower cutting edge 35. The upper cutting edge 37 is fixed to a pivoted upper cutting edge holder 36 by bolts 30 by way of plate springs 32.

As shown in FIG. 4, the semi-finished liner 18a cut off from the strip 4a is picked up by a suction head 38a of the pickup device. Then the semi-finished liner 18a is rotated by 90° about the axis 19a and the window portion 20a is cut by a cutter 39. After the window portion 20a is cut and the liner 21a is finished, the pickup device further rotates the liner 21a held by the suction head 38a by 90° and incorporates it into the casing 22a.

As shown in FIGS. 5A to 5C, the cutter 39 for cutting the window portion 20a comprises a pair of lower cutting edges 41 fixed to a table 40 by bolts 30, and a pair of upper cutting edges 44 fixedly mounted by a pair of bolts 30 on a holder 43 which is supported on the table 40 for pivotal movement about a pin 42. Each lower cutting edge 41 is provided on the inner surface with a tapered portion 45 for guiding the upper cutting edge 44. Of the bolts 30 for fixing the upper cutting edges 44 to the holder 43, the one nearer to the pin 42 is associated with spring plates 32 to resiliently press the upper cutting edges 44 against the holder 43 and the other bolt 30 presses the upper cutting edges 44 against the holder 43 without a plate spring, whereby the upper cutting edges 44 are slightly diverged away from each other toward the free ends thereof (FIG. 5B). The upper cutting edges 44 are arranged to form a crossing angle of 0.5° to 1° with respect to the lower cutting edges 41. Further, as shown in FIG. 5C, the holder 43 is trapezoidal in cross section with the lower side longer than the upper side so that the upper cutting edges 44 are diverged away from each other toward the lower cutting edges 41. This makes the cutting edges 41 and 44 cut better. Further, the pin 42 on which the holder 43 is pivoted is arranged so that the shear angle of the cutting edges 41 and 44 is not smaller than 2°.

As can be understood from the description above, in accordance with the present invention, the liner is formed by cutting steps, except for the central opening 13 which is stamped, and accordingly, the stamping dies may be simple and can be produced with high accuracy. This also lengthens the life of the stamping dies. Further, when the cutting edges become dull, they can be easily changed.

In the embodiment described above, two non-woven fabric strips are used, but three or more non-woven fabric strips may be used so that the liners can be fed in time even when the upper and lower halves of the casing are fed at a higher speed.

Further, in the method and the apparatus in accordance with the present invention, the non-woven fabric strips to be supplied need not have a width larger than the width of the liner to be formed and accordingly loss of the material can be minimized. Since each liner is cut off from the strip after the strips are separated, each liner can be easily separated from other liners.

Though in the embodiment described the first and second non-woven fabric strips are unrolled from separate rolls, they may be unrolled from a single roll which is formed by rolling one non-woven fabric strip superposed an another.

We claim:

1. A method of manufacturing a liner for a magnetic disk which is formed of non-woven fabric and has a predetermined width, a predetermined length, a central opening and contoured four corners, the method comprising the steps of: supplying a plurality of non-woven fabric strips, each having a width substantially equal to the width of the liner to be formed, in a stacked state, the strips having a length greater than the predetermined length; stamping out openings in each of of the stacked non-woven fabrics at the same time; cutting from each of the stacked non-woven fabrics, at the same time, the portion corresponding to the contoured four corners of the liners to be formed, said cutting being performed simultaneously with the stamping of the openings; subsequently separating the non-woven fabric strips; and, after separating the strips, cutting the leading edge portion of the non-woven fabric strips into the predetermined length.

2. An apparatus for manufacturing a liner for a magnetic disk which is formed of non-woven fabric and has a predetermined width, a predetermined length, a central opening and contoured four corners, the apparatus comprising: stamping dies having a punch portion and a die portion for stamping out at the same time the central openings in a plurality of non-woven fabric strips supplied in a stacked state, each having a width substantially equal to the width of the liner to be formed, the strips having a length greater than the predetermined length, lower cutting edges and upper cutting edges which are removably mounted on the punch portion and the die portion for cutting from each of the stacked non-woven fabrics, at the same time, the portion corresponding to the contoured four corners of the liners to be formed, said cutting being simultaneous with the stamping of the openings, means for separating the stacked non-woven fabrics with the cut portion, and means for cutting the leading edge portion of the separated non-woven strips into the predetermined length.

* * * * *